(12) United States Patent
Kitamura et al.

(10) Patent No.: US 7,842,383 B2
(45) Date of Patent: *Nov. 30, 2010

(54) YTTRIUM-ALUMINUM DOUBLE OXIDE THERMAL SPRAYING POWDER

(75) Inventors: Junya Kitamura, Kakamigahara (JP); Hiroaki Mizuno, Kakamigahara (JP); Tsuyoshi Itsukaichi, Iwakura (JP)

(73) Assignee: Fujimi Incorporated, Kiyosu-shi, Aichi (JP)

( * ) Notice: Subject to any disclaimer, the term of this patent is extended or adjusted under 35 U.S.C. 154(b) by 1098 days.

This patent is subject to a terminal disclaimer.

(21) Appl. No.: 11/289,830

(22) Filed: Nov. 30, 2005

(65) Prior Publication Data

US 2006/0116274 A1    Jun. 1, 2006

(30) Foreign Application Priority Data

Nov. 30, 2004    (JP)    .............................. 2004-347725

(51) Int. Cl.
 *B32B 15/00*    (2006.01)
(52) U.S. Cl. ........................ 428/402; 428/403; 428/404; 428/405; 428/323; 428/357; 423/263; 501/152; 106/286.1; 427/446
(58) Field of Classification Search ......... 428/402–405, 428/323, 357; 423/263; 501/152; 106/286.1; 427/446
See application file for complete search history.

(56) References Cited

U.S. PATENT DOCUMENTS

| 6,576,354 | B2 * | 6/2003 | Tsukatani et al. | ............ 428/702 |
| 6,916,534 | B2 | 7/2005 | Wayata et al. | ................ 428/402 |
| 7,279,221 | B2 * | 10/2007 | Kitamura et al. | ............ 428/402 |
| 2001/0003271 | A1 | 6/2001 | Otsuki | ......................... 118/723 |
| 2002/0160189 | A1 | 10/2002 | Wayata et al. | ................ 428/402 |

FOREIGN PATENT DOCUMENTS

| JP | 2002-080954 | 3/2002 |
| JP | 2002-332558 | 11/2002 |
| JP | 2003-095649 | 4/2004 |

OTHER PUBLICATIONS

Article entitled, "Evaluation for Plasma Resistance of Ceramics" on pp. 17 to 22 in Sumitomo Osaka Cement Technical Report 2004 edition.

* cited by examiner

*Primary Examiner*—Steven Bos
(74) *Attorney, Agent, or Firm*—Vidas, Arrett & Steinkraus, P.A.

(57) ABSTRACT

A thermal spraying powder contains granulated and sintered particles of an yttrium-aluminum double oxide formed by granulating and sintering raw-material particles. The crushing strength of the granulated and sintered particles is 15 MPa or more, and 10% particle size of the granulated and sintered particles is 6 µm or more. The thermal spraying powder is suitable for use in forming a thermal spray coating through plasma spraying.

10 Claims, No Drawings

YTTRIUM-ALUMINUM DOUBLE OXIDE THERMAL SPRAYING POWDER

BACKGROUND OF THE INVENTION

The present invention relates to a thermal spraying powder containing granulated and sintered particles of an yttrium-aluminum double oxide.

In a semiconductor manufacturing technique, as the requirement for the enhanced speed of semiconductor devices is increased, finer patterns have been developed. In particular, in the etching technique, wet etching that utilizes an acid or alkaline solvent is shifted to dry etching for higher machining accuracy. Specifically, a technique that has been widely used in manufacture of semiconductor components such as LSI is a technique for forming fine patterns through dry etching of gas plasma that uses a halogen based gas such as fluorine and chlorine.

In general, most of members of semiconductor manufacturing apparatuses are formed of metal such as stainless-steel and aluminum, and have low plasma erosion resistance, but members that have a risk of being eroded by plasma are formed of oxide ceramics such as alumina and yttria to avoid plasma erosion. As the diameters of silicon wafers are increased, the sizes of the semiconductor manufacturing apparatuses have been increased. Accordingly, the sizes of members of semiconductor manufacturing apparatuses have been increased. However, bulk oxide ceramics is difficult to machine and the manufacturing cost is high. Therefore, large-size members that have a risk of being eroded by plasma, in particular, are formed not of the bulk oxide ceramics, but of metal base material provided with an oxide ceramics coating on its surface.

Takao KITAGAWA et al. disclosed, in an article entitled "Evaluation for Plasma Resistance of Ceramics" on pages 17 to 22 in Sumitomo Osaka Cement Technical Report 2004 edition published on Dec. 15, 2003, that an yttrium-aluminum double oxide such as yttrium aluminum garnet (YAG) as well as oxide ceramics such as alumina has high plasma erosion resistance. However, bulk double oxide ceramics disclosed in the article is difficult to machine and the manufacturing cost is high like the bulk yttria and bulk alumina.

A plasma spraying method is well known as a technique for manufacturing coatings made of oxide ceramics and double oxide ceramics. The plasma spraying method is advantageous in that the speed for manufacturing a coating is faster than those of the physical vapor deposition method and the chemical vapor deposition method, and that the base material is not restricted. Furthermore, since the physical vapor deposition method and the chemical vapor deposition method need to be performed under vacuum or reduced pressure, or in an ambient atmosphere in which the composition of gas is controlled, the physical vapor deposition method and the chemical vapor deposition method must be performed in a stainless-steel or glass container to form a coating. Contrastingly, a coating can be formed in the atmospheric air with the plasma spraying method, and there are hardly any restrictions like those of the vapor deposition methods.

The thermal spraying powder is generally fed from a powder feeder to a spray gun through a thin powder tube having an inner diameter of a few millimeters. Therefore, in view of feeding the thermal spraying powder in a stable manner avoiding clogging of the powder tube, it is quite important that the thermal spraying powder has sufficient flowability. In this respect, since granulated and sintered particles having spherical shapes have sufficient flowability as compared to fused and crushed particles and sintered and crushed particles, the granulated and sintered particles are suitable for the thermal spraying powder.

Since the yttrium-aluminum double oxide has a relatively high melting point, there is a risk that the double oxide could be insufficiently fused by the spraying flame when used as the thermal spraying powder. However, in view of spraying the thermal spraying powder at high deposit efficiency, it is quite important that the thermal spraying powder is reasonably easily fused. In this respect, since each of the granulated and sintered particles is formed by granulating and sintering raw-material particles and therefore has appropriate gaps between the granulated and sintered raw-material particles, the granulated and sintered particles are reasonably easily fused as compared to the fused and crushed particles and the sintered and crushed particles. Thus, the granulated and sintered particles are suitable for the thermal spraying powder. The granulated and sintered particles are also suitable for the thermal spraying powder in that there is less risk of contamination by impurities during manufacture as compared to the fused and crushed particles and the sintered and crushed particles.

As described above, since the granulated and sintered particles are suitable for the thermal spraying powder, a technique for plasma spraying the granulated and sintered particles of the yttrium-aluminum double oxide as disclosed in Japanese Laid-Open Patent Publication No. 2002-80954 is useful as a technique for forming a thermal spray coating of the yttrium-aluminum double oxide. However, there is yet room for improvements in the technique disclosed in Japanese Laid-Open Patent Publication No. 2002-80954 in that the design idea for reliably forming the thermal spray coating is insufficient.

SUMMARY OF THE INVENTION

Accordingly, it is an objective of the present invention to provide a thermal spraying powder that reliably forms a thermal spray coating of an yttrium-aluminum double oxide. It is also an objective of the present invention to provide a thermal spraying method using the thermal spraying powder, and a method for forming a thermal spray coating using the thermal spraying powder.

To achieve the foregoing and other objectives of the present invention, a thermal spraying powder comprising granulated and sintered particles of an yttrium-aluminum double oxide formed by granulating and sintering raw-material particles is provided. The crushing strength of the granulated and sintered particles is 15 MPa or more, and 10% particle size of the granulated and sintered particles is 6 μm or more.

The present invention also provides a thermal spraying method that includes plasma spraying the thermal spraying powder.

Further, the present invention provides a method for forming a thermal spray coating. The method includes plasma spraying the thermal spraying powder to form the thermal spray coating.

Other aspects and advantages of the invention will become apparent from the following description, illustrating by way of example the principles of the invention.

DETAILED DESCRIPTION OF THE PREFERRED EMBODIMENTS

One embodiment of the present invention will now be described.

The thermal spraying powder of the preferred embodiment consists of granulated and sintered particles of an yttrium-aluminum double oxide. The granulated and sintered particles (secondary particles) are formed by granulating and sintering raw-material particles (primary particles). The thermal spraying powder is used for forming a thermal spray coating through, for example, plasma spraying.

When the crushing strength of the granulated and sintered particles is less than 15 MPa, clogging occurs in a powder tube, which feeds the thermal spraying powder from a powder feeder to a spray gun, causing problems in practical use. The clogging of the powder tube in this case is caused because the granulated and sintered particles easily collapse due to impact caused when the thermal spraying powder is fed from the powder feeder to the spray gun, and the resulting fine particles decrease the flowability of the thermal spraying powder. In addition, when the crushing strength of the granulated and sintered particles is less than 15 MPa, the deposit efficiency could be decreased or a phenomenon called spitting in which deposits of excessively molten thermal spraying powder fall off the inside wall of nozzle of the spray gun and are discharged from the spray gun could frequently be caused during spraying of the thermal spraying powder. The decrease of the deposit efficiency in this case is caused because the granulated and sintered particles easily collapse due to impact caused when the thermal spraying powder is fed from the powder feeder to the spray gun and when the thermal spraying powder is supplied into the spraying flame, and the resulting fine particles are not efficiently supplied to the spraying flame. Furthermore, the spitting caused in this case is due to excessively molten fine particles generated by the collapse of the granulated and sintered particles. Therefore, the crushing strength of the granulated and sintered particles must be 15 MPa or more. However, even if the crushing strength of the granulated and sintered particles is 15 MPa or more, if it is less than 17 MPa, and more specifically less than 20 MPa, clogging of the powder tube, decrease of the deposit efficiency, and occurrence of spitting are not significantly suppressed. Thus, the crushing strength of the granulated and sintered particles is preferably 17 MPa or more, and more preferably 20 MPa or more.

Contrastingly, when the crushing strength of the granulated and sintered particles is greater than 300 MPa, more specifically greater than 270 MPa, and even more specifically greater than 250 MPa, there are a risk that the deposit efficiency of the thermal spraying powder could be decreased and a risk that a dense thermal spray coating could not be obtained because the porosity of the thermal spray coating formed of the thermal spraying powder is increased. The decrease of the deposit efficiency and increase of the porosity in this case are caused due to the fact that the thermal spraying powder is not easily softened or molten sufficiently during thermal spraying. Therefore, in view of preventing decrease of the deposit efficiency and forming a dense thermal spray coating, the crushing strength of the granulated and sintered particles is preferably 300 MPa or less, more preferably 270 MPa or less, and most preferably 250 MPa or less.

When 10% particle size $D_{10}$ of the granulated and sintered particles is less than 6 μm, similar to the case where the crushing strength of the granulated and sintered particles is less than 15 MPa, clogging of the powder tube is caused, the deposit efficiency is decreased, or spitting is frequently caused while spraying the thermal spraying powder, which is troublesome in practical use. The clogging of the powder tube in this case is caused by decrease of the flowability of the thermal spraying powder due to small sized particles included in the granulated and sintered particles by a relatively large amount. Also, the decrease of the deposit efficiency in this case is caused because small sized particles included in the granulated and sintered particles by a relatively large amount are not efficiently supplied to the spraying flame. Furthermore, the occurrence of spitting in this case is caused because the small sized particles that are easily excessively molten during thermal spraying are included in the granulated and sintered particles by a relatively large amount. Therefore, the 10% particle size $D_{10}$ of the granulated and sintered particles must be 6 μm or more. However, even if the 10% particle size $D_{10}$ of the thermal spraying powder is 6 μm or more, if it is less than 8 μm, and more specifically less than 10 μm, occurrence of spitting or clogging of the powder tube are not significantly suppressed. Therefore, the 10% particle size $D_{10}$ of the granulated and sintered particles is preferably 8 μm or more, and more preferably 10 μm or more.

Contrastingly, when the 10% particle size $D_{10}$ of the granulated and sintered particles is greater than 30 μm, there is a risk that the deposit efficiency of the thermal spraying powder could be decreased because the thermal spraying powder is not easily softened or molten sufficiently. Therefore, in view of preventing decrease of the deposit efficiency, the 10% particle size $D_{10}$ of the granulated and sintered particles is preferably 30 μm or less. The 10% particle size $D_{10}$ of the granulated and sintered particles is the size of the particle that is lastly summed up when the volume of particles in the granulated and sintered particles is accumulated from particles of the smallest size in ascending order until the accumulated volume reaches 10% of the total volume of all the particles in the granulated and sintered particles. The 10% particle size $D_{10}$ of the granulated and sintered particles is measured using, for example, a laser diffraction/dispersion type of particle size measuring instrument.

When the average particle size of the granulated and sintered raw-material particles (granulated and sintered primary particles) is less than 0.2 μm, more specifically less than 0.4 μm, and even more specifically less than 0.5 μm, there is a risk that a slight degree of spitting could occur while spraying the thermal spraying powder because the thermal spraying powder becomes easy to be excessively molten. Therefore, in view of reliably preventing occurrence of spitting, the average particle size of the granulated and sintered raw-material particles is preferably 0.2 μm or more, more preferably 0.4 μm or more, and most preferably 0.5 μm or more.

Contrastingly, when the average particle size of the granulated and sintered raw-material particles is greater than 3.0 μm, more specifically greater than 2.7 μm, and even more specifically greater than 2.5 μm, there is a risk that the deposit efficiency of the thermal spraying powder could be slightly decreased because the thermal spraying powder is hindered from being sufficiently softened or molten. Therefore, in view of preventing decrease of the deposit efficiency, the average particle size of the granulated and sintered raw-material particles is preferably 3.0 μm or less, more preferably 2.7 μm or less, and most preferably 2.5 μm or less.

When the particle size dispersion index of the granulated and sintered raw-material particles is greater than 0.50, more specifically greater than 0.45, and even more specifically greater than 0.40, there are a risk that the deposit efficiency of the thermal spraying powder could be decreased and a risk that a dense thermal spray coating could not be obtained because the porosity of the thermal spray coating formed of thermal spraying powder is increased. The decrease of the deposit efficiency and increase of the porosity in this case are caused because fusion of the granulated and sintered particles does not proceed uniformly during thermal spraying because the sizes of the granulated and sintered raw-material particles are irregular. Therefore, in view of preventing decrease of the deposit efficiency and allowing the thermal spray coating to become dense, the particle size dispersion index of the granulated and sintered raw-material particles is preferably 0.50 or less, more preferably 0.45 or less, and most preferably 0.40 or less.

When a large amount of yttria is mixed in the granulated and sintered particles, fusion of the granulated and sintered particles does not proceed uniformly because the melting point of yttria is high as compared to the yttrium-aluminum double oxide. As a result, there are a risk that the deposit efficiency of the thermal spraying powder could be decreased, and a risk that a dense thermal spray coating could not be obtained because the porosity of the thermal spray coating formed of the thermal spraying powder is increased. Therefore, in view of preventing decrease of the deposit efficiency and allowing the thermal spray coating to become dense, the content of yttria in the granulated and sintered particles is preferably small. The content of yttria in the granulated and sintered particles is obtained from, for example, the ratio of an x-ray diffraction peak of yttria to an x-ray diffraction peak of the yttrium-aluminum double oxide. More specifically, the content of yttria in the granulated and sintered particles is obtained from the ratio of the intensity of an x-ray diffraction peak of a (222) plane of yttria to the intensity of the maximum peak among an x-ray diffraction peak of a (420) plane of a garnet phase of the yttrium-aluminum double oxide, an x-ray diffraction peak of a (420) plane of a perovskite phase of the yttrium-aluminum double oxide, and an x-ray diffraction peak of a (122) plane of a monoclinic phase of the yttrium-aluminum double oxide. The ratio of the intensity of the x-ray diffraction peak of yttria to the intensity of the maximum x-ray diffraction peak of the yttrium-aluminum double oxide is preferably 20% or less, more preferably 17% or less, and most preferably 15% or less.

When the ratio of the number of moles of yttrium in the yttrium-aluminum double oxide in terms of the number of moles of yttria to the number of moles of aluminum in the yttrium-aluminum double oxide in terms of the number of moles of alumina is less than 0.2, more specifically less than 0.22, and even more specifically less than 0.25, there is a risk that the property of the yttrium-aluminum double oxide could become similar to the property of alumina. More specifically, there is a risk that the property of the yttrium-aluminum double oxide could become similar to the property of alumina that performs, at 1000 to 1100° C., a phase transition from γ-alumina having a relatively low density to α-alumina having a relatively high density, and the porosity of the thermal spray coating formed of the thermal spraying powder could be significantly increased under a high temperature. Therefore, the ratio of yttrium to aluminum is preferably 0.2 or more, more preferably 0.22 or more, and most preferably 0.25 or more.

Contrastingly, when the ratio of the number of moles of yttrium in the yttrium-aluminum double oxide in terms of the number of moles of yttria to the number of moles of aluminum in the yttrium-aluminum double oxide in terms of the number of moles of alumina is greater than 4.0, more specifically greater than 3.5, and even more specifically greater than 3.0, there is a risk that the property of the yttrium-aluminum double oxide could become similar to the property of yttria. More specifically, since the melting point of the yttrium-aluminum double oxide is increased thereby hindering the thermal spraying powder from being softened or molten, there is a risk that the deposit efficiency of the thermal spraying powder could be decreased, and a dense thermal spray coating could not be obtained because the porosity of the thermal spray coating formed of the thermal spraying powder is increased. Therefore, the ratio of yttrium to aluminum is preferably 4.0 or less, more preferably 3.5 or less, and most preferably 3.0 or less.

When the bulk specific gravity of the thermal spraying powder is less than 0.7 g/cm$^3$, more specifically less than 0.9 g/cm$^3$, and even more specifically less than 1.0 g/cm$^3$, since the crushing strength of the granulated and sintered particles tends to decrease as the bulk specific gravity of the thermal spraying powder is decreased, there is a risk that a slight degree of spitting could occur during thermal spraying of the thermal spraying powder. Thus, in view of more reliably preventing occurrence of spitting, the bulk specific gravity of the thermal spraying powder is preferably 0.7 g/cm$^3$ or more, more preferably 0.9 g/cm$^3$ or more, and most preferably 1.0 g/cm$^3$ or more.

When the angle of repose of the thermal spraying powder is greater than 50 degrees, more specifically greater than 47 degrees, and even more specifically greater than 45 degrees, there is a risk that a slight degree of clogging of the powder tube could occur since the flowability of the thermal spraying powder is decreased. Therefore, in view of more reliably preventing clogging of the powder tube, the angle of repose of the thermal spraying powder is preferably 50 degrees or less, more preferably 47 degrees or less, and most preferably 45 degrees or less.

When the aspect ratio of the granulated and sintered particles is greater than 2, more specifically greater than 1.8, and even more specifically greater than 1.5, there is a risk that a slight degree of clogging of the powder tube could occur since the flowability of the thermal spraying powder is decreased. Therefore, in view of more reliably preventing clogging of the powder tube, the aspect ratio of the granulated and sintered particles is preferably 2 or less, more preferably 1.8 or less, and most preferably 1.5 or less. The aspect ratio of the granulated and sintered particles is obtained by dividing the longitudinal diameter, which is the length of the major axis of an ellipsoid that is closest to the shape of the granulated and sintered particles, by the lateral diameter, which is the length of the minor axis of the ellipsoid.

Next, a method for manufacturing the thermal spraying powder according to the preferred embodiment, that is, a method for manufacturing the granulated and sintered particles of the yttrium-aluminum double oxide will be described. The thermal spraying powder of the preferred embodiment is manufactured using, as raw particles, yttrium-aluminum double oxide particles such as yttrium aluminum garnet (abbrev. YAG), yttrium aluminum perovskite (abbrev. YAP), and yttrium aluminum monoclinic (abbrev. YAM), or a mixture of yttria particles and alumina particles. First, slurry is prepared by mixing the raw particles to a dispersion medium such as water and alcohol. An appropriate binder may be added to the slurry. Next, granulated particles are formed from the slurry using a roll granulator, a spray granulator, or a compression granulator. Thus obtained granulated particles are sintered, then cracked and classified to manufacture the granulated and sintered particles of the yttrium-aluminum double oxide.

The average particle size of the raw particles is preferably 0.005 to 1.5 μm, and more preferably 0.01 to 1 μm. When using the mixture of the yttria particles and the alumina particles as the raw particles, it is important to mix the yttria particles and the alumina particles as uniformly as possible. The sintering of the granulated particles may be performed in any of an atmospheric-air, an oxygen atmosphere, and an inert gas atmosphere such as argon and nitrogen. The maximum temperature during sintering is preferably 1000 to 1700° C., and more preferably 1200 to 1650° C., and the maximum temperature holding time is preferably 1 to 10 hours, and more preferably 2 to 8 hours.

The preferred embodiment has the following advantages.

In the thermal spraying powder of the preferred embodiment, the crushing strength of the granulated and sintered particles is set to 15 MPa or more, and the 10% particle size $D_{10}$ of the granulated and sintered particles is set to 6 μm or more. Therefore, according to the thermal spraying powder of the preferred embodiment, the thermal spray coating of the yttrium-aluminum double oxide is reliably formed while reliably suppressing occurrence of spitting and clogging of the powder tube.

The granulated and sintered particles generally have reliable flowability and high deposit efficiency as compared to the fused and crushed particles and the sintered and crushed particles. In addition, the granulated and sintered particles have less risk of contamination by impurities during a manufacturing process as compared to the fused and crushed particles and the sintered and crushed particles. Therefore, the thermal spraying powder of the preferred embodiment consisting of the granulated and sintered particles also has the above mentioned advantages. The fused and crushed particles of the yttrium-aluminum double oxide is manufactured by, for example, melting an yttrium-aluminum double oxide powder in an electric furnace, and crushing and classifying the yttrium-aluminum double oxide powder after being cooled and solidified. The sintered and crushed particles of the yttrium-aluminum double oxide is manufactured by, for example, sintering the yttrium-aluminum double oxide powder and then crushing and classifying the yttrium-aluminum double oxide powder.

The preferred embodiment may be modified as follows.

The thermal spraying powder may include components other than the granulated and sintered particles of the yttrium-aluminum double oxide. However, the content of the granulated and sintered particles of the yttrium-aluminum double oxide in the thermal spraying powder is preferably as close to 100% as possible.

A method for spraying the thermal spraying powder may be other than plasma spraying. However, the plasma spraying permits forming a high-quality thermal spray coating from the thermal spraying powder.

Next, examples and comparative examples of the present invention are explained.

In examples 1, 3 to 16, 20 and comparative examples 1, 2, granulated and sintered YAG powders obtained by granulating and sintering the mixture of the yttria powder and the alumina powder were prepared as the thermal spraying powders. In example 2, the granulated and sintered YAG powder obtained by granulating and sintering the YAG powder was prepared as the thermal spraying powder. In examples 17 to 19 and comparative example 3, granulated and sintered YAP powders obtained by granulating and sintering the mixture of the yttria powder and the alumina powder were prepared as the thermal spraying powders. In examples 21 to 23, granulated and sintered YAM powders obtained by granulating and sintering the mixture of the yttria powder and the alumina powder were prepared as the thermal spraying powders. In comparative example 4, a granulated YAG powder obtained by granulating the YAG powder was prepared as the thermal spraying powder. In comparative example 5, a fused and crushed YAG powder obtained by melting and crushing the YAG powder was prepared as the thermal spraying powder. Specifics of the thermal spraying powders of examples 1 to 23 and comparative examples 1 to 5 are as shown in Table 1.

The column entitled "10% particle size $D_{10}$" in Table 1 represents the 10% particle size $D_{10}$ of the thermal spraying powders measured using a laser diffraction/dispersion type of particle size distribution measuring instrument "LA-300" manufactured by HORIBA Ltd.

The column entitled "Crushing strength" represents the crushing strength σ [MPa] of the particles in the thermal spraying powder calculated in accordance with the equation: $\sigma=2.8\times L/\pi/d^2$. In the equation, L represents the critical load [N], d represents the average particle size [mm] of the particles in the thermal spraying powder. The critical load is the compressive load applied to the particles in the thermal spraying powder at the point in time when the amount of displacement of an indenter is rapidly increased when the compressive load that increases at a constant rate is applied to the particles by the indenter. The critical load is measured using a micro compression testing instrument "MCTE-500" manufactured by Shimadzu Corporation.

The column entitled "Average particle size of primary particles" in Table 1 represents the mean of the Feret's diameter of the granulated and sintered raw-material particles or granulated raw-material particles in the thermal spraying powders measured using a field-emission scanning electron microscope (FE-SEM). The numerical values in this column represent the average particle size of the granulated and sintered raw-material particles in the case of examples 1 to 23 and comparative examples 1 to 3, and the average particle size of the granulated raw-material particles in the case of comparative example 4. The Feret's diameters of 50 granulated and sintered raw-material particles or granulated raw-material particles included in each of 10 particles arbitrarily selected from each thermal spraying powder were measured. The Feret's diameter is the distance between two parallel lines that are tangent to a particle.

The column entitled "Dispersion index" in Table 1 represents the particle size dispersion index D of the primary particles (the granulated and sintered raw-material particles or the granulated raw-material particles) in the thermal spraying powders calculated in accordance with the equation: $D=(\Sigma|d-d_s|)/n/d_s$. In the equation, d represents the particle size [μm] of the primary particles, $d_s$ represents the average particle size [μm] of the primary particles, and n represents the number of the primary particles the particle sizes of which were measured. The numerical values in this column represent the particle size dispersion index of the granulated and sintered raw-material particles in the case of examples 1 to 23 and comparative examples 1 to 3, and the particle size dispersion index of the granulated raw-material particles in the case of comparative example 4.

The column entitled "Relative peak intensity of yttria" in Table 1 represents the ratio of the intensity of the x-ray diffraction peak of the (222) plane of yttria to the intensity of the maximum peak among the x-ray diffraction peak of a (420) plane of the garnet phase, the x-ray diffraction peak of the (420) plane of the perovskite phase, and the x-ray diffraction peak of the (122) plane of the monoclinic phase in the thermal spraying powders.

The column entitled "Ratio of yttrium to aluminum" in Table 1 represents the ratio of the number of moles of yttrium in the thermal spraying powders in terms of the number of moles of yttria to the number of moles of aluminum in the thermal spraying powders in terms of the number of moles of alumina.

The column entitled "Angle of repose" in Table 1 represents the angle of repose of the thermal spraying powders measured using A.B.D-powder characteristic measuring instrument "A.B.D-72 model" manufactured by Tsutsui Rikagaku Kikai Co., Ltd.

The column entitled "Bulk specific gravity" in Table 1 represents the bulk specific gravity of the thermal spraying powders measured using a JIS apparent density measuring instrument (see JIS-Z-2504) manufactured by Tsutsui Rikagaku Kikai Co., Ltd.

The column entitled "Aspect ratio" in Table 1 represents the mean of the aspect ratios computed based on the longitudinal diameter and the lateral diameter of the particles in the thermal spraying powders measured using the scanning electron microscope. The aspect ratios of 50 particles arbitrarily selected from each of the thermal spraying powders were computed.

The thermal spraying powders of examples 1 to 23 and comparative examples 1 to 5 were plasma sprayed in accordance with the conditions shown in Table 2. Then, based on the clogging state of the powder tube that is connected between the powder feeder and the spray gun, the thermal spraying powders were evaluated according to a four rank scale: excellent (1), good (2), acceptable (3), and poor (4). That is, when clogging occurred in less than 5 minutes after starting feeding of the thermal spraying powder, the thermal spraying powder was ranked poor, when clogging occurred in 5 minutes or more and less than 30 minutes, the thermal spraying powder was ranked acceptable, when clogging occurred in 30 minutes or more and less than 90 minutes, the thermal spraying powder was ranked good, and when clogging did not occur at the point in time when 90 minutes had elapsed, the thermal spraying powder was ranked excellent. The evaluation results are shown in the column entitled "Clogging of powder tube" in Table 1.

The thermal spraying powders of examples 1 to 23 and comparative examples 1 to 5 were plasma sprayed in accordance with the conditions shown in Table 2. Then, based on occurrence of spitting during the spraying process, the thermal spraying powders were evaluated according to a two rank scale: good (1), and poor (2). That is, when mixing of deposits of excessively molten thermal spraying powder in the thermal spray coating was visually recognizable, it was ranked poor, and when mixing of deposits of excessively molten thermal spraying powder in the thermal spray coating was not visually recognizable, it was ranked good. The evaluation results are shown in the column entitled "Spitting" in Table 1.

The thermal spraying powders of examples 1 to 23 and comparative examples 1 to 5 were plasma sprayed in accordance with the conditions shown in Table 2 and the weights of thus formed thermal spray coatings were measured. The ratio of the weight of the thermal spray coating to the weight of the thermal spraying powder used for spraying was calculated as the deposit efficiency. Then, based on the deposit efficiency, the thermal spraying powders were evaluated according to a four rank scale: excellent (1), good (2), acceptable (3), and poor (4). That is, when the deposit efficiency was 55% or more, the thermal spraying powder was ranked excellent, when it was 50% or more and less than 55%, the thermal spraying powder was ranked good, when it was 45% or more and less than 50%, the thermal spraying powder was ranked acceptable, and when it was less than 45%, the thermal spraying powder was ranked poor. The evaluation results are shown in the column entitled "Deposit efficiency" in Table 1.

The thermal spraying powders of examples 1 to 23 and comparative examples 1 to 5 were plasma sprayed in accordance with the conditions shown in Table 2 to form the thermal spraying coatings. Each thermal spray coating was then cut along a surface that is perpendicular to the upper surface of the thermal spray coating, and the cut surface was mirror polished. The porosity of the thermal spray coating at the cut surface was measured using an image analysis processor "NSFJ1-A" manufactured by N Support Corporation. Then, based on the measured porosity, the thermal spraying powders were evaluated according to a four rank scale: excellent (1), good (2), acceptable (3), and poor (4). That is, when the porosity was less than 7%, the thermal spraying powder was ranked excellent, when it was 7% or more and less than 10%, the thermal spraying powder was ranked good, when it was 10% or more and less than 13%, the thermal spraying powder was ranked acceptable, and when it was 13% or more, the thermal spraying powder was ranked poor. The evaluation results are shown in the column entitled "Porosity" in Table 1.

TABLE 1

| | Type of powder | 10% particle size $D_{10}$ [μm] | Crushing strength [MPa] | Average particle size of primary particles [μm] | Dispersion index | Relative peak intensity of yttria [%] | Ratio of yttrium to aluminum | Angle of repose [degrees] |
|---|---|---|---|---|---|---|---|---|
| Ex. 1 | granulated-sintered | 15.4 | 110 | 1.35 | 0.36 | 0 | 0.60 | 39 |
| Ex. 2 | granulated-sintered | 14.1 | 138 | 1.45 | 0.33 | 0 | 0.60 | 43 |
| Ex. 3 | granulated-sintered | 6.3 | 135 | 1.29 | 0.39 | 0 | 0.60 | 44 |
| Ex. 4 | granulated-sintered | 16.4 | 17 | 0.98 | 0.41 | 0 | 0.60 | 45 |
| Ex. 5 | granulated-sintered | 14.0 | 288 | 0.88 | 0.42 | 0 | 0.60 | 41 |
| Ex. 6 | granulated-sintered | 15.9 | 308 | 1.98 | 0.40 | 0 | 0.60 | 42 |
| Ex. 7 | granulated-sintered | 31.0 | 86 | 0.65 | 0.29 | 0 | 0.60 | 45 |
| Ex. 8 | granulated-sintered | 14.0 | 210 | 2.76 | 0.31 | 0 | 0.60 | 46 |
| Ex. 9 | granulated-sintered | 15.9 | 124 | 3.14 | 0.34 | 0 | 0.60 | 47 |
| Ex. 10 | granulated-sintered | 15.2 | 139 | 0.29 | 0.38 | 0 | 0.60 | 43 |
| Ex. 11 | granulated-sintered | 15.1 | 88 | 0.18 | 0.41 | 0 | 0.60 | 41 |
| Ex. 12 | granulated-sintered | 15.0 | 121 | 1.45 | 0.48 | 0 | 0.60 | 45 |
| Ex. 13 | granulated-sintered | 17.2 | 145 | 1.19 | 0.54 | 0 | 0.60 | 46 |
| Ex. 14 | granulated-sintered | 16.8 | 318 | 4.05 | 0.52 | 5 | 0.65 | 44 |
| Ex. 15 | granulated-sintered | 9.2 | 86 | 1.55 | 0.25 | 16 | 0.72 | 44 |
| Ex. 16 | granulated-sintered | 15.3 | 98 | 1.45 | 0.33 | 22 | 0.81 | 45 |
| Ex. 17 | granulated-sintered | 17.1 | 116 | 1.24 | 0.40 | 11 | 1.04 | 41 |
| Ex. 18 | granulated-sintered | 6.6 | 134 | 1.75 | 0.33 | 7 | 0.97 | 46 |
| Ex. 19 | granulated-sintered | 14.5 | 18 | 1.38 | 0.37 | 8 | 1.00 | 44 |
| Ex. 20 | granulated-sintered | 17.2 | 123 | 1.78 | 0.34 | 0 | 0.24 | 43 |
| Ex. 21 | granulated-sintered | 16.9 | 146 | 1.17 | 0.41 | 25 | 3.45 | 41 |
| Ex. 22 | granulated-sintered | 17.8 | 165 | 1.45 | 0.37 | 33 | 4.10 | 43 |
| Ex. 23 | granulated-sintered | 16.8 | 156 | 0.89 | 0.41 | 15 | 1.87 | 41 |
| C. Ex. 1 | granulated-sintered | 5.2 | 120 | 1.56 | 0.41 | 0 | 0.60 | 46 |

TABLE 1-continued

| | | | | | | | | |
|---|---|---|---|---|---|---|---|---|
| C. Ex. 2 | granulated-sintered | 16.4 | 11 | 0.75 | 0.34 | 0 | 0.60 | 45 |
| C. Ex. 3 | granulated-sintered | 17.5 | 13 | 0.67 | 0.28 | 2 | 1.05 | 47 |
| C. Ex. 4 | granulated | 16.4 | 4 | 0.65 | 0.44 | 0 | 0.60 | 43 |
| C. Ex. 5 | fused-crushed | 18.3 | — | — | — | 0 | 0.60 | 48 |

| | Bulk specific gravity [g/cm³] | Aspect ratio | Clogging of powder tube | Spitting | Deposit efficiency | Porosity |
|---|---|---|---|---|---|---|
| Ex. 1 | 1.6 | 1.2 | 1 | 2 | 1 | 1 |
| Ex. 2 | 1.8 | 1.1 | 1 | 2 | 1 | 1 |
| Ex. 3 | 1.8 | 1.1 | 2 | 2 | 1 | 1 |
| Ex. 4 | 1.1 | 1.2 | 2 | 2 | 2 | 1 |
| Ex. 5 | 1.8 | 1.2 | 1 | 2 | 2 | 3 |
| Ex. 6 | 1.7 | 1.2 | 1 | 2 | 3 | 3 |
| Ex. 7 | 2.0 | 1.1 | 1 | 2 | 3 | 1 |
| Ex. 8 | 1.6 | 1.3 | 1 | 2 | 2 | 2 |
| Ex. 9 | 1.8 | 1.2 | 1 | 2 | 3 | 2 |
| Ex. 10 | 1.2 | 1.1 | 1 | 2 | 1 | 2 |
| Ex. 11 | 1.6 | 1.1 | 1 | 2 | 2 | 1 |
| Ex. 12 | 1.2 | 1.2 | 1 | 2 | 2 | 1 |
| Ex. 13 | 1.4 | 1.1 | 1 | 2 | 2 | 2 |
| Ex. 14 | 1.5 | 1.1 | 1 | 2 | 3 | 2 |
| Ex. 15 | 1.8 | 1.3 | 1 | 2 | 1 | 2 |
| Ex. 16 | 1.6 | 1.2 | 1 | 2 | 2 | 3 |
| Ex. 17 | 1.6 | 1.1 | 1 | 2 | 1 | 1 |
| Ex. 18 | 1.8 | 1.2 | 2 | 2 | 1 | 1 |
| Ex. 19 | 0.9 | 1.2 | 2 | 2 | 2 | 1 |
| Ex. 20 | 1.3 | 1.1 | 1 | 2 | 3 | 2 |
| Ex. 21 | 1.5 | 1.1 | 1 | 2 | 2 | 2 |
| Ex. 22 | 1.4 | 1.1 | 1 | 2 | 2 | 2 |
| Ex. 23 | 1.7 | 1.2 | 1 | 2 | 1 | 2 |
| C. Ex. 1 | 1.8 | 1.1 | 3 | 4 | — | — |
| C. Ex. 2 | 1.1 | 1.4 | 3 | 4 | — | — |
| C. Ex. 3 | 1.0 | 1.4 | 3 | 4 | — | — |
| C. Ex. 4 | 0.8 | 1.2 | 4 | 4 | — | — |
| C. Ex. 5 | 2.2 | 3.4 | 1 | 2 | 4 | 4 |

TABLE 2

Base material: aluminum plate (250 mm × 75 mm × 3 mm) that has been blast finished using a brown alumina abrasive (A#40)
Spray gun: "SG-100" manufactured by Praxair
Powder feeder: "Model 1264" manufactured by Praxair
Ar gas pressure: 50 psi
He gas pressure: 50 psi
Voltage: 37.0 V
Current: 900 A
Spraying distance: 100 mm
Feed rate of powders: 20 g/minute As shown in Table 1, any of the evaluations in examples 1 to 23 is either acceptable, good, or excellent. Contrastingly, in comparative examples 1 to 5, at least one of the evaluations is poor. The results suggest that the thermal spraying powders of examples 1 to 23 reliably form the thermal spray coatings of yttrium-aluminum double oxide. In comparative examples 1 to 4, since clogging of the powder tube occurred immediately after starting spraying, the thermal spray coatings were not formed.

The invention claimed is:

1. A thermal spraying powder comprising granulated and sintered particles of an yttrium-aluminum double oxide formed by granulating and sintering raw-material particles, wherein the crushing strength of the granulated and sintered particles is 86 MPa or more, and 10% particle size $D_{10}$ of the granulated and sintered particles is 6 μm or more, and wherein, when x-ray diffraction of the thermal spraying powder is measured, the ratio of the intensity of an x-ray diffraction peak of a (222) plane of yttria to the intensity of the maximum peak among an x-ray diffraction peak of a (420) plane of a garnet phase of the yttrium-aluminum double oxide, an x-ray diffraction peak of a (420) plane of a perovskite phase of the yttrium-aluminum double oxide, and an x-ray diffraction peak of a (122) plane of a monoclinic phase of the yttrium-aluminum double oxide is 20% or less.

2. The thermal spraying powder according to claim 1, wherein the crushing strength of the granulated and sintered particles is 300 MPa or less.

3. The thermal spraying powder according to claim 1, wherein the average particle size of the raw-material particles after the granulating and sintering is 0.2 to 3.0 μm.

4. The thermal spraying powder according to claim 1, wherein the particle size dispersion index of the raw-material particles after the granulating and sintering is 0.50 or less.

5. The thermal spraying powder according to claim 1, wherein the ratio of the number of moles of yttrium in the yttrium-aluminum double oxide in terms of the number of moles of yttria to the number of moles of aluminum in the yttrium-aluminum double oxide in terms of the number of moles of alumina is 0.2 to 4.0.

6. The thermal spraying powder according to claim 1, wherein the bulk specific gravity of the thermal spraying powder is 0.7 g/cm³ or more.

7. The thermal spraying powder according to claim 1, wherein the angle of repose of the thermal spraying powder is 50 degrees or less.

8. The thermal spraying powder according to claim 1, wherein the aspect ratio of the granulated and sintered particles is 2 or less.

9. A thermal spraying method comprising plasma spraying a thermal spraying powder containing granulated and sintered particles of an yttrium-aluminum double oxide formed by granulating and sintering raw-material particles, wherein the crushing strength of the granulated and sintered particles is 86 MPa or more, and 10% particle size $D_{10}$ of the granulated and sintered particles is 6 μm or more, and wherein, when x-ray diffraction of the thermal spraying powder is measured, the ratio of the intensity of an x-ray diffraction peak of a (222) plane of yttria to the intensity of the maximum peak among an x-ray diffraction peak of a (420) plane of a garnet phase of the yttrium-aluminum double oxide, an x-ray diffraction peak of a (420) plane of a perovskite phase of the yttrium-aluminum double oxide, and an x-ray diffraction peak of a (122) plane of a monoclinic phase of the yttrium-aluminum double oxide is 20% or less.

10. A method for forming a thermal spray coating, the method comprising plasma spraying a thermal spraying powder to form the thermal spray coating, wherein the thermal spraying powder contains granulated and sintered particles of an yttrium-aluminum double oxide formed by granulating and sintering raw-material particles, and wherein the crushing strength of the granulated and sintered particles is 86 MPa or more, and 10% particle size $D_{10}$ of the granulated and sintered particles is 6 μm or more, and wherein, when x-ray diffraction of the thermal spraying powder is measured, the ratio of the intensity of an x-ray diffraction peak of a (222) plane of yttria to the intensity of the maximum peak among an x-ray diffraction peak of a (420) plane of a garnet phase of the yttrium-aluminum double oxide, an x-ray diffraction peak of a (420) plane of a perovskite phase of the yttrium-aluminum double oxide, and an x-ray diffraction peak of a (122) plane of a monoclinic phase of the yttrium-aluminum double oxide is 20% or less.

* * * * *